Oct. 25, 1938.　　　W. HOPPE ET AL　　　2,134,043
PAPER ROLL SUPPORT
Filed March 3, 1938
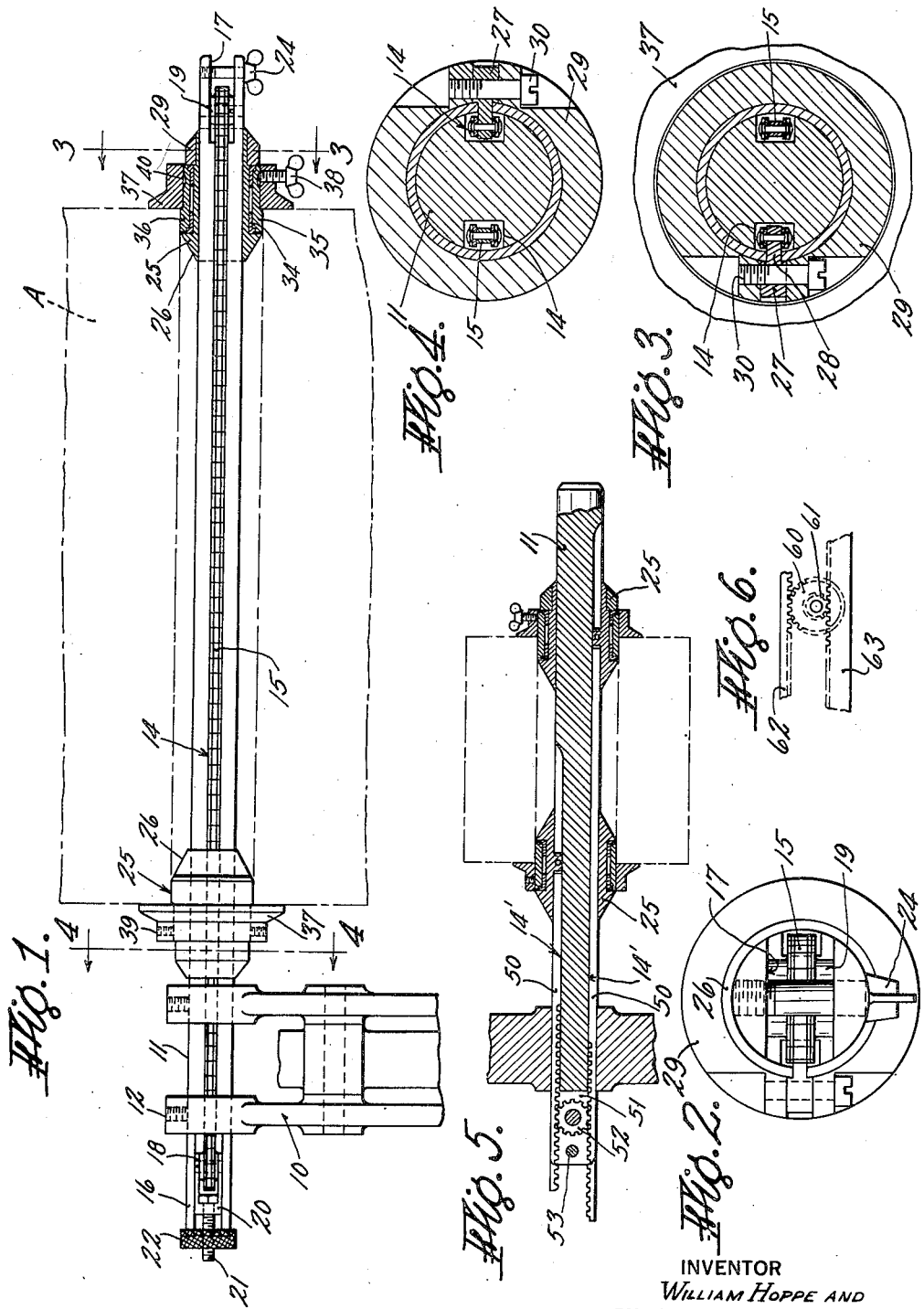
INVENTOR
WILLIAM HOPPE AND
BY FRANKLIN B. ROBERTS
Chapin + Neal
ATTORNEYS Patented Oct. 25, 1938

2,134,043

UNITED STATES PATENT OFFICE 2,134,043

PAPER ROLL SUPPORT

William Hoppe and Franklin B. Roberts, Springfield, Mass., assignors to National Bread Wrapping Machine Co., Springfield, Mass., a corporation of Massachusetts Application March 3, 1938, Serial No. 193,729

9 Claims. (Cl. 242—68)

Our invention relates to means for supporting a roll of paper or other web material from which the web is drawn for feeding to a wrapping machine, printing press, box covering machine, and the like.

It is one object of the invention to provide a support of the above character on which rolls of different length may be quickly and easily centered with respect to the centerline of the machine which it serves.

Another object is to provide a centering means which when once set for a roll of given length need not be disturbed in changing rolls of that length.

Other and further objects will be made apparent in the following specification and claims.

In the accompanying drawing,

Fig. 1 is a side elevation, partly in section, of a support constructed according to our invention;

Fig. 2 is an end view of the supporting shaft, looking from the right of Fig. 1, but on a larger scale;

Fig. 3 is a sectional view substantially on line 3—3 of Fig. 1, on the same scale as Fig. 2;

Fig. 4 is a similar sectional view substantially on line 4—4 of Fig. 1;

Fig. 5 is a longitudinal sectional view of a supporting shaft showing an alternative form of construction; and Fig. 6 is a detail view showing a modification of the structure of Fig. 5.

Referring to the drawing, 10 indicates a bracket of any suitable form, in which the roll supporting shaft 11 is rigidly secured adjacent one of its ends as by set screws 12.

The shaft 10 is made of sufficient size to support the roll of paper without using a bracket at both ends, thus leaving one end free for the application or removal of the roll as later described.

The shaft 11 is provided on diametrically opposite sides with grooves 14 of sufficient depth to receive an endless sprocket chain 15. The ends of the shaft are split or forked as at 16 and 17 in line with the channels. Small sprockets 18 and 19, about which the chain 15 is trained, are respectively mounted in forks 16 and 17. Sprocket 18 which is mounted in the fork 16 at the supported end of the shaft, outwardly of the bracket 10, is journaled in a U-shaped bearing 20 slidable in the fork and provided with a stud 21 threaded in a knurled nut 22 engaging the end of the stud by which the chain may be tightened. The sprocket 19 is journaled directly in the arms of fork 17 inwardly of the ends of the fork. A wing headed screw 24 extends through one arm of the fork 17 and is threaded into the opposite arm forming means by which the arms can be drawn together to clamp sprocket 19 against rotation.

Slidably mounted on shaft 11 are a pair of members 25, provided on their adjacent ends with cone-shaped flanges 26. As best shown at the right of Fig. 1 and in Figs. 3 and 4, members 25 are secured to opposite runs of the chain 15 by lugs 27 suitably secured to a link of the chain and extending through slots 28 formed in the members 25. The outer end of each lug 27 is positioned between the ends of a split collar 29 and is perforated to receive a machine screw 30 which extends through one end of the split collar and is threaded into the other end so that by tightening the screw the collar is tightly clamped to the member 25.

On member 25 between the cone flanges 26 and the collars 29 are rotatably mounted on ring bearings 34, cylindrical members 35 formed with a shoulder portion 36 for engagement in the ends of the paper roll indicated by dotted lines, at A. The roll is held in proper position on the shoulders 36 by flanged collars 37 releasably held on the cylindrical members 35 by a wing headed set screw 38 in the case of the collar at the free end of shaft 11 and by ordinary set screws 39 in the collar adjacent the bracket 10. A wing screw is employed for the outer collar because of the necessity for its frequent removal in placing a new roll of paper on the shaft. The cylindrical member 35 is preferably provided with an annular groove 40 to receive the end of screw 38 to properly position the collar 37 and assure that hand setting up of the screw will be sufficient to retain the collar in place.

From the above description it will be seen that to remove or replace a roll it is only necessary to remove the collar 37 at the free end of the shaft 11 when the roll can be slipped off and on over the end of the shaft. In setting the device for a given size of roll, the collar 37 at the free end being removed, clamp screw 24 is loosened, freeing sprocket 19. The right hand member 25, as viewed in Fig. 1, is then grasped and drawn outwardly toward the end of the shaft a distance in excess of the length of the roll. Since the members 25 are attached to opposite sides of the chain 15, the left hand member 25 moves an equal distance toward the bracket increasing the distance between the members but maintaining the center line between them. The roll of paper is slipped over the end of the shaft and against the left hand collar 37. The right hand collar 37 is then secured in place and the right hand member 25 pushed into engagement with the end of the roll, the left hand member 25 advancing the roll to meet the right hand member. Clamp screw 24 is then tightened to clamp sprocket 19 in position, thus holding members 25 stationary. Once positioned for a given size of roll the setting of the parts need not be disturbed in removing or replacing a roll of that size since these operations require only the removal of the collar 37 at the free end of the shaft.

In Fig. 5 is shown an alternative construction in which the members 25 are secured to racks 50 positioned in the grooves 14'. In this construction only one end of shaft 11 is forked as at 51. A pinion 52 is mounted in the fork 51 with its opposite sides in driving engagement with the teeth of rack 50. A clamp screw 53, similar to screw 24, is adapted to draw the arms of fork 51 together to releasably clamp the pinion against rotation.

A modification of the structure of Fig. 5 is shown in Fig. 6 in which the pinion 52 has been replaced by a double pinion of different diameters as indicated at 60 and 61 so that the racks 62 and 63 travel at different speeds. By this arrangement the centerline of the roll is shifted a predetermined amount depending on the length of the roll instead of being maintained in a fixed position as is the case in Figs. 1 and 5, as may be useful in certain web treating operations.

We claim:

1. A support for a roll of paper or the like which comprises a shaft supported at one end only, a pair of roll supporting members slidably mounted on the shaft, means for moving said members simultaneously toward and from each other, to adjust the supporting members to rolls of different lengths and means for retaining a roll on the supports, said roll retaining means being releasable independently of the support adjusting means to permit application and removal of the roll endwise of the free end of the shaft in any adjusted position of the roll supporting members.

2. A support for a roll of paper or the like which comprises a shaft supported at one end only, a pair of roll supporting members slidably mounted on the shaft, means for moving said members simultaneously toward and from each other to adjust the supporting members to rolls of different lengths, while maintaining the center line of the roll constant, cylindrical members engageable within the ends of the roll and rotatably mounted on the supporting members, and means for retaining the roll on said cylindrical members, said roll retaining means being releasable independently of the support adjusting means to permit application and removal of the roll endwise of the free end of the shaft in any adjusted position of roll supporting members.

3. A support for a roll of paper or the like which comprises a shaft supported at one end only, a pair of roll supporting members slidably mounted on the shaft, means for moving said members simultaneously toward and from each other to adjust the supporting members to rolls of different length while maintaining the center line of the roll constant, cylindrical members engageable within the ends of the roll and rotatably mounted on the supporting members, and flanged collars mounted on said cylindrical members and engaging the end faces of the roll, the flanged collar adjacent the free end of the shaft being removable endwise of the free end of the shaft.

4. A support for a roll of paper or the like which comprises a shaft supported at one end only, said shaft being provided with a pair of longitudinal grooves, a pair of roll supporting members slidably mounted on the shaft, means travelling in said grooves for moving said members simultaneously toward and from each other to adjust the supporting members to rolls of different length, and means for retaining a roll on said supports, said roll retaining means being releasable independently of the support adjusting means to permit application and removal of the roll endwise of the free end of the shaft in any adjusted position of the roll supporting members.

5. A support for a roll of paper or the like which comprises a shaft supported at one end only, said shaft being provided with longitudinal grooves positioned on opposite sides, a pair of sprockets journaled in opposite ends of the shaft in alignment with each other and with the grooves, a sprocket chain trained around the sprockets and running in the grooves, and a pair of roll supporting members, having portions engageable within the ends of the roll, slidably mounted on the shaft and respectively connected to opposite runs of the chain.

6. A support for a roll of paper or the like which comprises a shaft supported at one end only, said shaft being provided with longitudinal grooves positioned on opposite sides, a pair of sprockets journaled in opposite ends of the shaft in alignment with each other and with the grooves, a sprocket chain trained around the sprockets and running in the grooves, a pair of roll supporting members slidably mounted on the shaft and respectively connected to opposite runs of the chain, means to releasably restrain the chain against movement, cylindrical members engageable within the ends of the roll and rotatably mounted on the supporting members, and flanged collars mounted on said cylindrical members and engaging the end faces of the roll, the flanged collar adjacent the free end of the shaft being removable endwise of the free end of the shaft.

7. A support for a roll of paper or the like which comprises a shaft, a pair of roll supporting members slidably mounted on the shaft and a reverse drive connecting said members and driving either member from the other, for simultaneously moving the members toward and from each other.

8. A support for a roll of paper or the like which comprises a shaft provided with a pair of longitudinal grooves, a freely rotatable gear member journaled in the shaft for rotation in the plane of the grooves, a pair of roll supporting members slidably mounted on the shaft and gear means sliding in the grooves and connecting the roll supporting members respectively to opposite sides of the rotatable gear member.

9. In a support for a roll of paper or the like, a pair of roll supporting members and a reverse drive connecting said members together for simultaneous movement toward and from each other in driving-driven relation.

WILLIAM HOPPE.
FRANKLIN B. ROBERTS.